April 24, 1928.  1,667,565
C. R. RADCLIFFE
HYDRAULIC POWER TRANSMITTING APPARATUS FOR MOTOR VEHICLES
Filed April 24, 1917   3 Sheets-Sheet 2

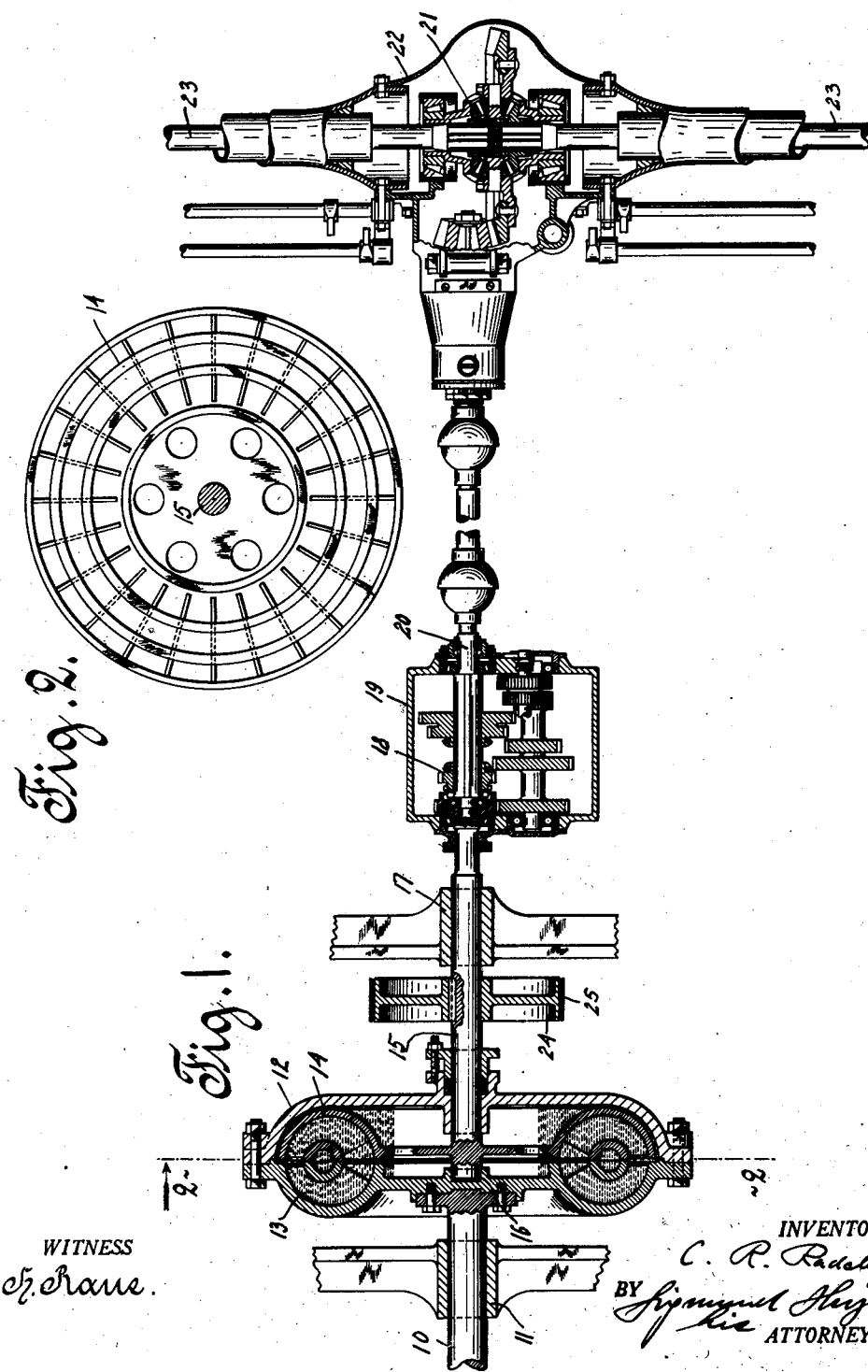

WITNESS
F. Crane.

INVENTOR.
C. R. Radcliffe
BY
ATTORNEY

April 24, 1928.
C. R. RADCLIFFE
1,667,565
HYDRAULIC POWER TRANSMITTING APPARATUS FOR MOTOR VEHICLES
Filed April 24, 1917
3 Sheets-Sheet 3
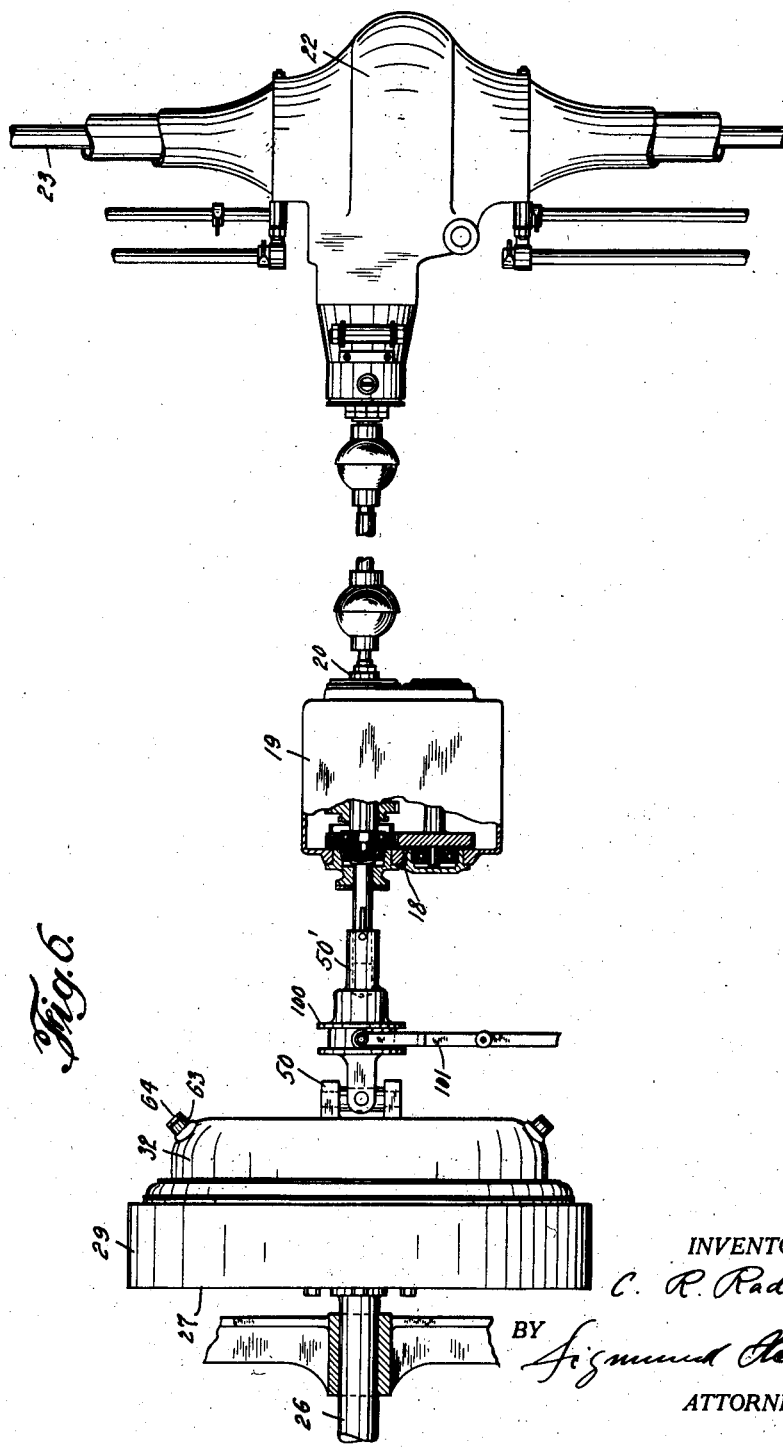
INVENTOR
C. R. Radcliffe
BY
ATTORNEY Patented Apr. 24, 1928.

1,667,565

UNITED STATES PATENT OFFICE.

CARLTON R. RADCLIFFE, OF NEW YORK, N. Y.; CRESSIDA C. RADCLIFFE EXECUTRIX OF SAID CARLTON R. RADCLIFFE, DECEASED.

HYDRAULIC POWER-TRANSMITTING APPARATUS FOR MOTOR VEHICLES.

Application filed April 24, 1917. Serial No. 164,256.

The present invention relates to improvements in hydraulic power transmitting apparatus, especially adapted for use in connection with motor vehicles.

The main objects of the invention are to combine the gasoline motor of a vehicle, a hydraulic power transmitting apparatus and a change speed gear in such a manner that, first, a neutral position is provided, where there is no driving connection between the motor and the wheels of the vehicle, second, an easy means is obtained of getting into driving connection from said neutral position while the motor is running, and, third, means are provided whereby, when necessary, an increased torque may be transmitted to the wheels of said vehicle or their motion reversed, and a practical means of accomplishing these results while the motor is running and the vehicle either moving or standing still.

With these and other objects in view, which will more fully appear as the nature of the invention is better understood, the same consists in the combination, arrangement, and construction of parts hereinafter described, pointed out in the appended claims and illustrated in the accompanying drawings, it being understood that many changes may be made in the size and proportion of the several parts and details of construction within the scope of the appended claims without departing from the spirit or sacrificing any of the advantages of the invention.

Two of the many possible embodiments of the invention are illustrated in the accompanying drawings, in which:—

Figure 3:
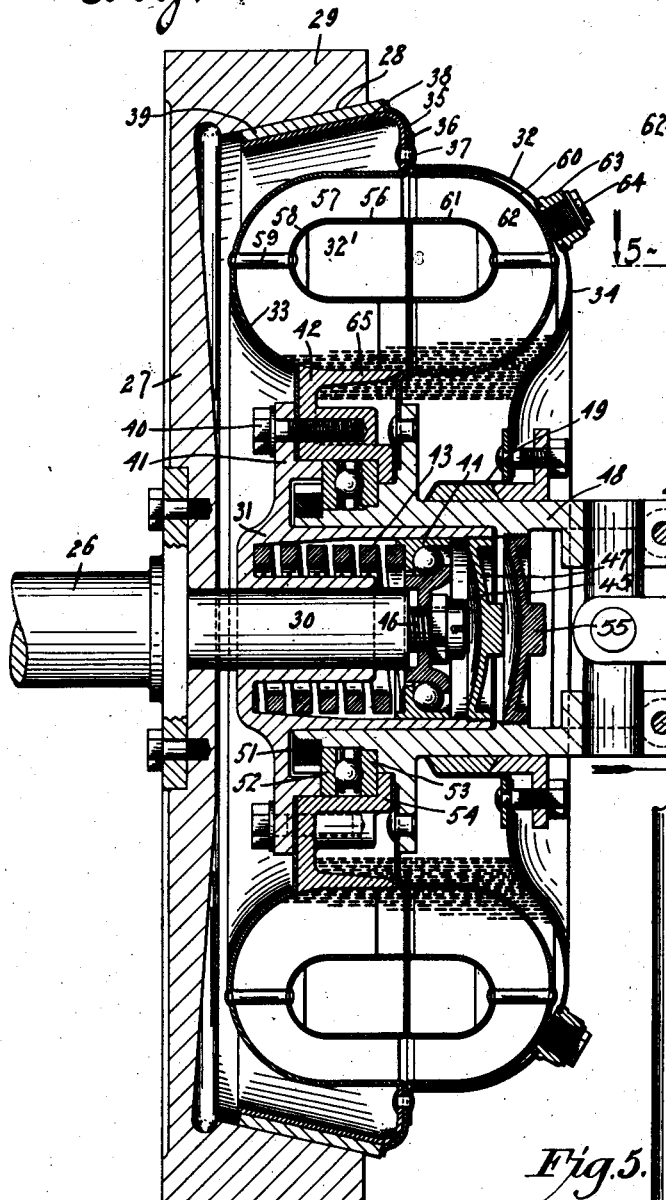
Figure 4:
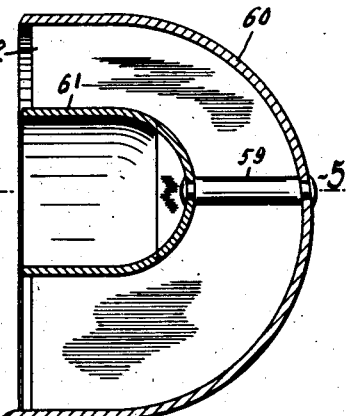
Figure 5:
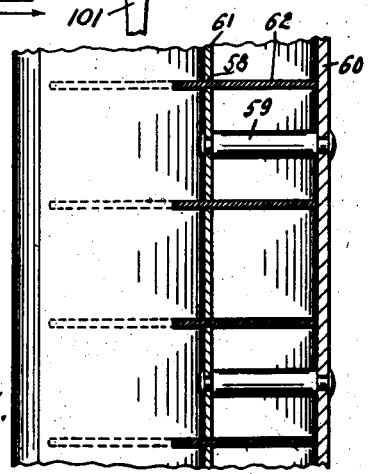

Figure 1 is a plan view of a hydraulic power transmitting apparatus combined with a speed gear and the rear axle of a motor vehicle; Fig. 2 is a section taken on line 2—2 of Fig. 1; Fig. 3 is a section taken through a modified apparatus; Fig. 4 is a section taken through a detail of construction; Fig. 5 is a section taken on line 5—5 of Fig. 4; and Fig. 6 is a plan view of the hydraulic power transmitting apparatus shown in Fig. 3 of the drawings combined with a speed gear and the rear axle of a motor vehicle.

Referring now first to Figs. 1 and 2 of the drawings, the numeral 10 indicates the crank shaft of a motor vehicle engine, suitably journaled in bearings, one of which is shown only and denoted by the numeral 11. To the shaft is bolted or otherwise secured a closed casing 12, in which is disposed a primary wheel 13, in the form of a centrifugal pump impeller, that is shown as being made integral with the said casing. Within the casing is furthermore located a secondary turbine wheel 14, designed like the runner of a turbine. This wheel is juxtaposed to the primary wheel in a manner that the passages in the two wheels merge and form the whole circuit in which the actuating liquid circulates. The secondary turbine wheel is attached to a driven shaft 15, that is journaled in a recessed boss 16 in the casing and in a bearing 17, in alignment with the said boss. With the driven shaft is associated a change speed gear 18, that is disposed within a gear box 19. This gear may be of any suitable construction, the one herein disclosed being shown for purposes of illustration only. The means for shifting the gears of the speed gear for changes in speed has not been shown. With the driven member 20 of the change speed gear is connected a differential gear 21 within an axle housing 22, into which reach the inner ends of a floating rear axle 23.

To the driven shaft 15 of the transmission is keyed, or otherwise fixedly attached, a brake drum 24, with which is associated a brake band 25, (the means for actuating the latter being not shown).

The casing 12 of the power transmitting apparatus is either partly or wholly filled with a suitable liquid.

A means for bringing the driven shaft 15 of the transmission to standstill is essential in order that any of the gears of the transmission, when in neutral positions as shown in Fig. 1, may be meshed without shock. This is accomplished by applying the brake band 25 to the brake drum 24. This brake is used only in going from neutral position into geared connection with the rear wheels and in unmeshing the gears, when the car is not running. This operation is necesssary due to the frictional drag between the primary and secondary turbine wheels, the slight circulation of the acting fluid from the primary wheel 13 to the secondary wheel 14, and also the friction of the stuffing box, the torque produced on the shaft 15 causing the counter shaft of the gear box to rotate. This frictional load has been found so great that it would be dangerous to the life of the transmission to try and mesh the gears under these conditions. This drag is also considerable, when the car is standing (even with the motor throttled as slow as practicable to run it), as to make it very difficult to slide the gears out of mesh.

Instead of holding the driven member of the transmission against rotation, the entire transmitting apparatus may be disconnected from the crank shaft, for the purpose mentioned. A construction of this type is shown in Figs. 3 to 5, inclusive, in which the numeral 26 indicates the crank shaft of the vehicle engine. This shaft is bolted to a fly wheel 27, the inner face 28 of the rim 29 of which is conical, so as to constitute one of the elements of a clutch. The shaft 26 is provided with a reduced extension 30, upon which is slidably mounted a cup-shaped member 31, that is connected with the casing 32 of the power transmitting apparatus. The casing comprises two oppositely dished ring-shaped members 33 and 34, which are provided at their peripheral portions with flanges 35 and 36, respectively, and are joined, for instance, by rivets 37, the latter attaching to the said flanges a conical rim 38, that extends into the fly wheel, and is provided with a clutch lining 39, which is adapted to cooperate with the conical inner face 28 of the rim 29 of the fly wheel. The member 33 of the casing is clamped, for instance, by bolts 40 between a flange 41 upon the cup-shaped member 31 and a ring 42, that is disposed within the casing. In order to maintain the two members of the clutch in engagement, there is disposed within the cup-shaped member 31 a spring 43, which bears against the said cup-shaped member and against a ball bearing 44, the latter being also located within the cup-shaped member and held in place upon the reduced extension of the shaft 26 by a nut 45, meshing with the screw-threaded portion 46 of the said extension. A cover 47 closes the cup-shaped member 31.

The section 34 of the casing is drawn over the driven member 48 of the apparatus, and its portion which is drawn over the said driven member is shaped, as clearly shown at 49, to constitute with the said driven member a stuffing box. The driven member is in the form of a tubular body, that is rotatably mounted upon the cup-shaped member 31. The outer end of the driven member is shaped for connection with the driven shaft 50', the connection being made preferably by a universal joint, designated by the numeral 50. On the driven shaft is formed a collar 100, in engagement with the fork-shaped end of a shifting lever 101. To prevent the driven member from shifting longitudinally upon the cup-shaped member 31, its inner end is screw-threaded and in engagement with a nut 51, bearing against the ring 52 of a ball bearing, the companion ring 53 of which abuts against a flange 54 upon the ring 42 above described. A cover 55 closes the tubular driven member, to prevent entrance of foreign matter between the contacting cylindrical surfaces of the cup 31 and the said driven member. The shaft 50' is connected with the change speed gear 18, the brake drum 24 and brake band 25, shown in Fig. 1 of the drawings, being omitted.

Within the casing 32 is formed the primary wheel 32' of the apparatus, in the form of a centrifugal pump impeller. This wheel includes the ring-shaped section 33 of the casing, which is, as above described, dished. Within this ring is disposed a second ring, denoted by the numeral 56, the latter being properly spaced from the ring 33, thereby forming an annular curved channel, which is subdivided into radial passages by blades 57. These blades are straight, as clearly shown in Figs. 3 to 5, inclusive of the drawings. For the purpose of keeping the blades properly in place the ring 56 is provided with radial slots 58, into which fit the said blades. The blades are held in place and the two rings are secured together by a plurality of rivets 59, passing through the said two rings. The secondary turbine wheel is attached to the driven member 48, and comprises a dished ring 60, within which is disposed a similarly shaped ring 61, corresponding to the ring 56 of the primary wheel. The blades 62 are held between the two rings in the same manner as those of the primary wheel.

The apparatus is either partly or wholly filled with a suitable liquid, for instance, through nipples 63, which are closed by plugs 64. The primary and secondary wheels, are in the case illustrated, arranged in such a manner that the outlet of the discharge side of the primary wheel fits as closely as possible the admission side of the secondary wheel, and the outlet of the discharge side of the secondary wheel fits as closely as possible the inlet side of the primary wheel, although this feature is not essential as far as the invention herein described is concerned. It is to be observed that the flange 65 on the ring 42 completes the circuit in which the actuating liquid flows, the said flange forming a continuation of the section 33 of the casing, and being interposed between the said section and the ring 60 of the secondary wheel. This flange is provided for structural reasons only. The section 33 of the casing could be easily formed so as to make the use of this flange unnecessary.

The operation of this device is as follows: The spring 43 keeps the two members of the clutch in engagement. If, therefore, rotation is imparted to the driving shaft 26, the actuating fluid receives energy in the primary wheel, which is transmitted to the secondary turbine wheel, from which the liquid returns again to the primary wheel. The secondary wheel is thus rotated, power being transmitted to the driven member 48. If it is intended to stop the rotation of the driven member, the casing with the elements therein, is moved against the action of the spring 43 in the direction of the arrow shown in Fig. 3 of the drawings, whereby the two members of the clutch are disengaged, the casing, or in other words the primary turbine wheel, will thus cease to rotate, the result being that the secondary turbine wheel is brought to a stop.

It is to be observed that, while in the embodiments of the invention herein described a hydraulic power transmitting apparatus, a change speed gear and a differential gear of a particular type has been mentioned, any other constructions may be used without departing from the invention, which lies mainly in combining a hydraulic power transmission and change speed gear with means for bringing the driven member of the transmission to a stop while maintaining the rotation of the driving member or engine shaft.

What I claim is:

1. In a motor vehicle, the combination with the engine fly wheel and the change speed gear of the vehicle, of a hydraulic power transmitting apparatus interposed between said elements, said hydraulic power transmitting apparatus including a primary turbine wheel in the form of a centrifugal pump impeller and a secondary turbine wheel, and a clutch on said fly wheel and said power transmitting apparatus to cause the last named two elements to revolve together or to be free, at will.

2. In a motor vehicle, the combination with the engine fly wheel and the change speed gear of the vehicle, of a hydraulic power transmitting apparatus interposed between said elements and including a casing, and means on said fly wheel and said casing for engaging or disengaging, at will, said last named two elements.

3. In a motor vehicle, the combination with the engine fly wheel and the change speed gear of the vehicle, of a hydraulic power transmitting apparatus interposed between said elements and including a casing, a clutch on said fly wheel and said casing, and means for shifting said casing and thereby disengaging or engaging, at will, the members of said clutch.

4. In a motor vehicle, the combination with the engine fly wheel and the change speed gear of the vehicle, of a hydraulic power transmitting apparatus interposed between said elements and including a casing, a clutch on said fly wheel and said casing, and means for shifting said power transmitting apparatus and thereby engaging or disengaging, at will, the members of said clutch.

Signed at New York, in the county of New York, and State of New York, this 2nd day of March, A. D. 1917.

CARLTON R. RADCLIFFE.